US012614171B2

(12) United States Patent
Garg et al.

(10) Patent No.: US 12,614,171 B2
(45) Date of Patent: Apr. 28, 2026

(54) METHOD AND SYSTEM FOR CANCELLATION OF DISTRIBUTED LEDGER TRANSACTIONS

(71) Applicant: MASTERCARD INTERNATIONAL INCORPORATED, Purchase, NY (US)

(72) Inventors: Chandan Garg, Haryana (IN); Shubham Kumar, Haryana (IN); Puneet Keshtwal, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 549 days.

(21) Appl. No.: 17/506,808

(22) Filed: Oct. 21, 2021

(65) Prior Publication Data

US 2023/0128004 A1 Apr. 27, 2023

(51) Int. Cl.
*G06Q 20/38* (2012.01)
*G06Q 20/06* (2012.01)

(52) U.S. Cl.
CPC ....... *G06Q 20/3829* (2013.01); *G06Q 20/065* (2013.01); *G06Q 2220/00* (2013.01)

(58) Field of Classification Search
CPC ............. G06Q 20/3829; G06Q 20/065; G06Q 2220/00
See application file for complete search history.

(56) References Cited

U.S. PATENT DOCUMENTS 12,141,798 B2 * 11/2024 Fletcher ................. G06F 9/542
2023/0186290 A1 * 6/2023 Navon ................ G06Q 20/401
705/64

OTHER PUBLICATIONS

Franco, "Understanding Bitcoin: Cryptography, Engineering and Economics," Wiley, ISBN: 978-1-119-01916-9, 2015, 144pages. (Year: 2015).*
Lu, "Coin Metrics' State of the Network: Issue 53," Coin Metrics, Jun. 2020, retrieved from https://coinmetrics.substack.com/p/coin-metrics-state-of-the-network-9b9 (Year: 2020).*
Harding, "Opt-in Full Replace-by-Fee Signaling," Github 'Bitcoin' Repository, Dec. 2015, retrieved from https://github.com/bitcoin/bips/blob/b57eea446cbd99088da1a9badc2fb85396982b9f/bip-opt-in-rbf.mediawiki (Year: 2015).*

* cited by examiner

*Primary Examiner* — Patrick Mcatee
*Assistant Examiner* — Scott Michael Diroma
(74) *Attorney, Agent, or Firm* — Panitch Schwarze Belisario & Nadel LLP

(57) ABSTRACT

The present disclosure provides a description of exemplary systems and methods for superseding pending transactions in a distributed ledger. The methods and systems may include a processor which may receive a first transaction associated with a digital asset in a memory pool of a distributed ledger network, the first transaction having a first priority. The processor may receive a second transaction associated with the digital asset in the memory pool of the distributed ledger network, the second transaction having a second priority. The processor may analyze the first priority of the first transaction and the second priority of the second transaction to determine a higher priority. In response to determining that the first priority of the first transaction is less than the second priority of the second transaction, the processor may validate the second transaction having the second priority.

12 Claims, 4 Drawing Sheets

First Computing Node

102

Network
106

Second
Computing Node

104n

Second
Computing Node

104b

Second
Computing Node

104a

100

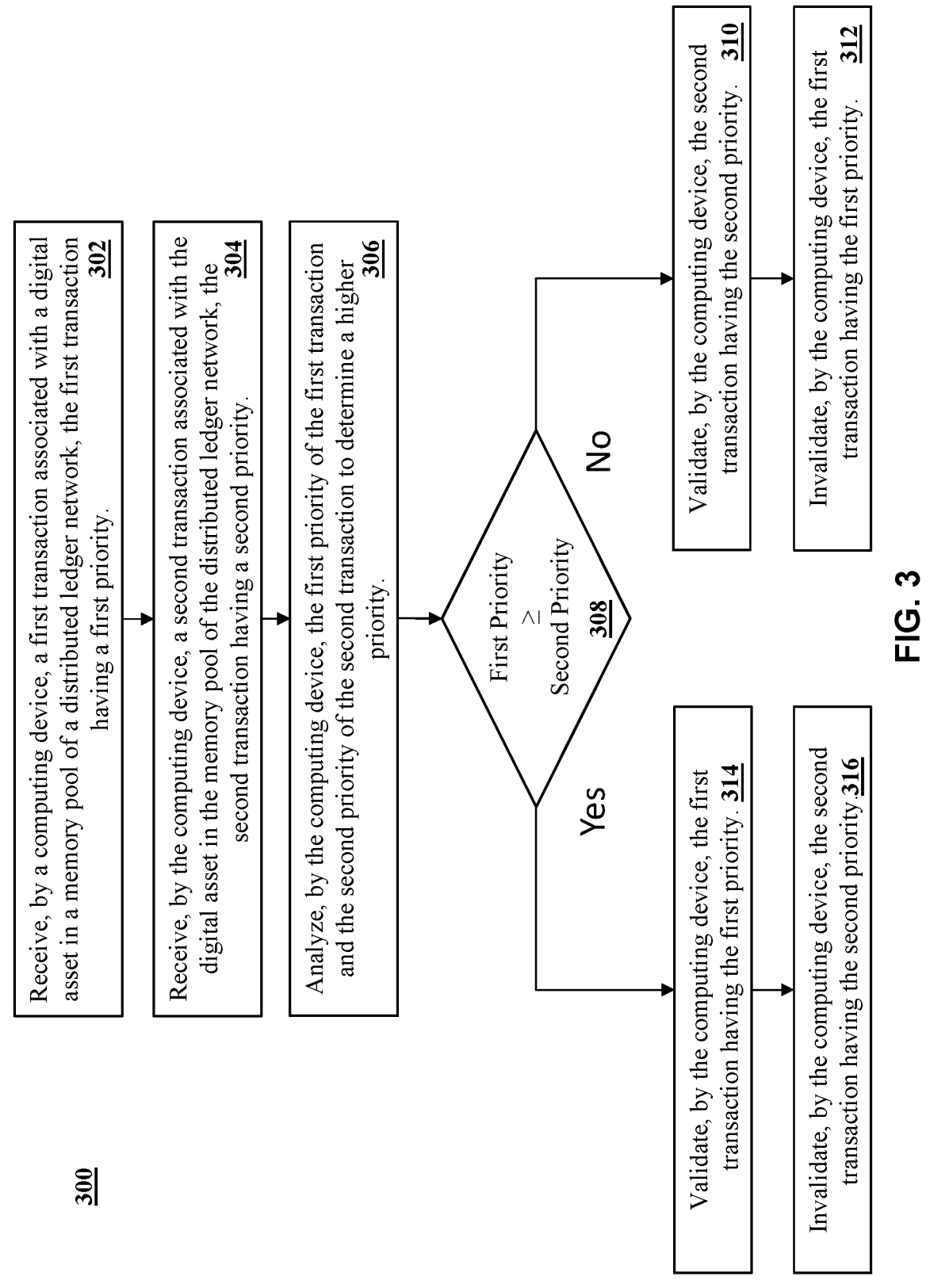

300

Receive, by a computing device, a first transaction associated with a digital asset in a memory pool of a distributed ledger network, the first transaction having a first priority. 302

Receive, by the computing device, a second transaction associated with the digital asset in the memory pool of the distributed ledger network, the second transaction having a second priority. 304

Analyze, by the computing device, the first priority of the first transaction and the second priority of the second transaction to determine a higher priority. 306

First Priority ≥ Second Priority 308

Yes

No

Validate, by the computing device, the first transaction having the first priority. 314

Invalidate, by the computing device, the second transaction having the second priority. 316

Validate, by the computing device, the second transaction having the second priority. 310

Invalidate, by the computing device, the first transaction having the first priority. 312

FIG. 3

METHOD AND SYSTEM FOR CANCELLATION OF DISTRIBUTED LEDGER TRANSACTIONS

TECHNICAL FIELD

The present disclosure generally relates to distributed ledger transactions, specifically, superseding pending transaction in a distributed ledger.

BACKGROUND

Blockchains are used as a public ledger of electronic transactions. Each new block of transactions that is added to a blockchain provides for further validation of the previous blocks, resulting in the blockchain becoming stronger and stronger as the blockchain grows over time. Because past blocks in the blockchain never change, and because the blockchain does not lose or discard past blocks, the blockchain becomes an immutable, yet publicly accessibly, record of all transactions. Blockchains can also offer additional benefits that encourage their use in the conducting of electronic transactions, such as anonymity and security.

In order to generate new blocks for a blockchain, blockchain nodes called miner nodes compete to solve a complex mathematical problem to "mine" a new block of transactions to add to the blockchain. A miner node then transmits a solution to the complex mathematical problem to the rest of the blockchain nodes for validation. Miner nodes select transactions from a memory pool, which contains all the verified transactions that occurred on the blockchain network and are waiting to be added, e.g., "mined," to the blockchain. Once a verified transaction is added to the memory pool of the blockchain network, there is no way to alter or cancel that transaction. Currently, a verified transaction may not be mined in current systems if the transaction sits in the memory pool for an extended period time, e.g., two weeks—usually due to a low mining fee. In those cases, the transaction will drop from the memory pool and any digital asset associated with that transaction will be returned to the original owner. Another way a verified transaction may not be mined in current systems is if the original owner of the digital asset double spends the digital asset by propagating a second transaction for the same digital asset with a higher mining fee in the hope that the transaction with the higher mining fee is picked up first; thus invalidating the transaction with the lower mining fee. Finally, a verified transaction may not be mined in current systems if the original owner of the digital asset reached out to mining pools within the network and requests the transaction not be picked up for mining. However, in current systems there is no way to cancel a transaction once the transaction enters the memory pool. Thus, there is a need for a technical solution that enables a user on the blockchain network to supersede pending transactions in the memory pool before they are mined and added to the blockchain.

SUMMARY

The present disclosure provides a description of exemplary systems and methods for superseding pending transactions in a distributed ledger. The methods and systems may include a processor which may receive a first transaction associated with a digital asset in a memory pool of a distributed ledger network, the first transaction having a first priority. The processor may receive a second transaction associated with the digital asset in the memory pool of the distributed ledger network, the second transaction having a second priority. The processor may analyze the first priority of the first transaction and the second priority of the second transaction to determine a higher priority. In response to determining that the first priority of the first transaction is less than the second priority of the second transaction, the processor may validate the second transaction having the second priority.

The present disclosure also provides a description of a method for superseding a pending transaction in a distributed ledger including receiving, by a computing device, a first transaction associated with a digital asset in a memory pool of a distributed ledger network, the first transaction having a first priority, and receiving, by the computing device, a second transaction associated with the digital asset in the memory pool of the distributed ledger network, the second transaction having a second priority. The method also includes analyzing, by the computing device, the first priority of the first transaction and the second priority of the second transaction to determine a higher priority; and in response to determining that the first priority of the first transaction is less than the second priority of the second transaction, validating, by the computing device, the second transaction having the second priority.

The present disclosure further provides a description of a system for superseding a pending transaction in a distributed ledger including one or more processors, one or more computer-readable memories, one or more computer-readable tangible storage devices, and instructions stored on at least one of the one or more storage devices for execution by at least one of the one or more processors via at least one of the one or more memories. The instructions include instructions to receive, by a computing device, a first transaction associated with a digital asset in a memory pool of a distributed ledger network, the first transaction having a first priority; instructions to receive, by the computing device, a second transaction associated with the digital asset in the memory pool of the distributed ledger network, the second transaction having a second priority; instructions to analyze, by the computing device, the first priority of the first transaction and the second priority of the second transaction to determine a higher priority; and in response to determining that the first priority of the first transaction is less than the second priority of the second transaction, instructions to validate, by the computing device, the second transaction having the second priority.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 3 is a flow chart illustrating exemplary methods for superseding pending transactions in a distributed ledger in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency or network. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof-of-work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Superseding Pending Transactions in a Distributed Ledger

Figure 1:
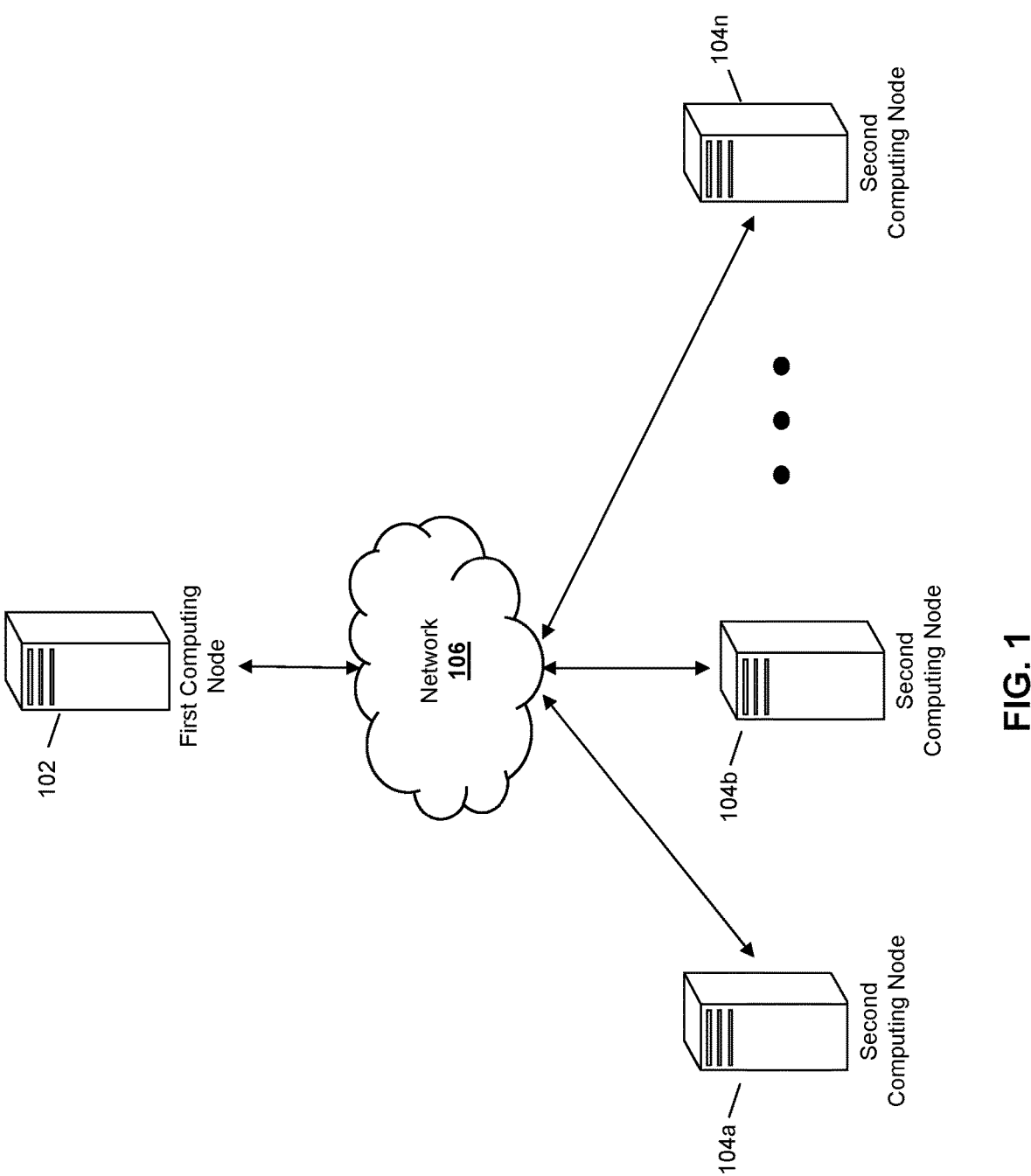
FIG. 1 is a block diagram illustrating a high level system architecture for superseding pending transactions in a distributed ledger in accordance with exemplary embodiments.

FIG. 1 illustrates a system 100 for superseding pending transactions in a distributed ledger.

In the system 100, a first computing node 102 and second computing nodes 104a-104n may communicate via a network 106. The first computing node 102 and the second computing nodes 104a-104n may be any type of computing system that is specially configured to perform the functions discussed herein, such as the computing system 200 illustrated in FIG. 2 or the computing system 400 illustrated in FIG. 4, as discussed in more detail below. Further, it can be appreciated that the first computing node 102 and the second computing nodes 104a-104n may include one or more computing devices.

In the system 100, the network 106 may be the Internet, representing a worldwide collection of networks and gateways to support communications between devices connected to the Internet. The network 106 may include, for example but not limited to, wired, wireless or fiber optic connections. In other embodiments, the network 106 may be implemented as an intranet, a local area network (LAN), a wide area network (WAN), or a personal area network (PAN). In general, the network 106 can be any combination of connections and protocols that will support communications between the first computing node 102 and the second computing nodes 104a-104n that can be specifically configured to carry out the methods described herein.

In an exemplary embodiment, the first computing node 102 and the second computing nodes 104a-104n may be part of a distributed ledger network, such as, but not limited to, a blockchain network. While reference is made throughout to a blockchain network, it can be appreciated that the methods and systems discussed herein may be executed using any distributed ledger network that utilizes a memory pool to store transactions before they are posted to a distributed ledger.

In an exemplary embodiment of the system 100, the second computing nodes 104a-104n are miner nodes in a blockchain network, e.g., the network 106. Miner nodes are computing nodes within a blockchain network that compete against each other to solve a complex mathematical problem by generating a hash within a defined set of parameters for a block of transactions selected from a memory pool. The miner node that transmits a correct hash to the network, e.g., the other nodes in a blockchain network, and receives consensus, e.g., fifty-one percent or more of the network validates the hash, wins and the block mined by that miner node is added onto the blockchain. In a blockchain network, each miner node, e.g., the secondary computing nodes 104a-n, has a memory pool (shown in FIG. 2), e.g., the memory pool 208, which contains recent verified transactions on the distributed ledger network. The memory pool may contain different transactions on each of the second computing nodes 104a-104n depending on the memory capacity of each of the second computing nodes 104a-104n. For example, the second computing node 104a may have a memory capacity of one gigabyte of random access memory (RAM) and the second computing node 104n may have a memory capacity of two gigabytes of RAM; thus, the memory pool of the computing device 104a may contain fewer transactions than the memory pool of the second computing device 104n. Therefore, it can be appreciated that each miner node, e.g., the second computing nodes 104a-104n, may have the same set or a different set of transactions in their respective memory pools. The memory pool of a blockchain network has a limited storage capacity and thus transactions must be cleared from the memory pool periodically. A blockchain network may clear transactions from the memory pool of the blockchain network via an automatic process. For example, a blockchain network may utilize a smart contract with a set of rules which define which transactions should be cleared from the memory pool. For example, a smart contract may clear transactions from the memory pool after a defined period of time, such as, but not limited to, two days, two weeks, a month, etc. Therefore, transactions must be mined by a miner node of the blockchain network within the defined period of time or they will be invalidated and cleared from the memory pool with the digital asset associated with those transaction being returned to the owner.

In a blockchain network, e.g., the network 106, the nodes of the blockchain network, e.g., the first computing node 102 and the second computing nodes 104a-104n, may transfer digital assets via transactions. A node, e.g., the first computing node 102, may initiate a transaction of a digital asset to another node, e.g., the second computing node 104a, by inputting transaction data which may include, but is not limited to, a receiving address for the second computing device 104a, e.g., a public key hash associated with the second computing device 104*a*, an output, e.g., a digital asset, input transactions, e.g., where the digital asset originated, and a transaction fee, e.g., a mining fee. The first computing device 102 may also include a message in the transaction data. The first computing node 102 digitally signs the transaction using a private key associated with the first computing node 102 and broadcasts the signed transaction along with the public key associated with the first computing node 102 to the blockchain network. The other nodes on the blockchain network, e.g., the second computing nodes 104*a*-104*n*, verify the first transaction by evaluating the signature of the first computing node 102 on the first transaction. After the other nodes on the blockchain, e.g., the second computing nodes 104*a*-104*n*, verify the first transaction, the first transaction is then added to the memory pools of the miner nodes of the blockchain network, e.g., the second computing nodes 104*a*-104*n*, where the verified transaction can be selected by one or more of the miner nodes to be mined into a block of transactions and added to the blockchain.

In a first exemplary embodiment of the system 100, the first transaction initiated by the first computing node 102 will be associated with a counter input indicating the priority of the first transaction. The counter input may be, but is not limited to, a numerical number. The counter input may be added, for example, but not limited to, automatically by the first computing node 102 or manually by a user of the first computing node 102. For example, all transactions initiated by the first computing node 102 may be given a default counter input, e.g., "1," automatically by the first computing node or manually by a user of the first computing node 102. Further, the counter input may be changed by the user of the first computing node 102 to indicate a higher priority transaction. For example, a user of the first computing node 102 may change the counter input for a transaction from a "1" to a "−4" to indicate that that transaction should be prioritized by the blockchain network over any other transaction from the first computing node 102 with a higher counter input, e.g., any transaction with a counter input greater than "−4." Thus, a transaction from the first computing node 102 with a counter input of "−4" would be mined by the miner nodes, e.g., the second computing nodes 104*a*-104*n*, before any other transactions with a counter input greater than "−4". While a lower counter input is used to indicate a higher priority transaction in the examples above, it can be appreciated that a higher number could also be used to indicate a higher priority transaction depending on the rules of the blockchain network.

In an exemplary embodiment, the counter input can be used to prioritize transactions of different digital assets as in the previous example or a user of the first computing node 102 can use the counter input to supersede a previous transaction for a digital asset with a new transaction for the same digital asset by giving the new transaction a higher priority counter input. For example, the first computing node 102 initiates a first transaction with the second computer node 104*a* for a digital asset, e.g., a cryptocurrency amount, on a blockchain network. The first transaction is given a counter input of "1." As stated above, the counter input may be added automatically by the first computing node 102 or may be added manually by a user of the first computing node 102. The first computing node 102 digitally signs the first transaction using a private key associated with the first computing node 102 and broadcasts the signed first transaction along with the public key associated with the first computing node 102 to the blockchain network. The other nodes on the blockchain network, e.g., the second computing nodes 104*a*-104*n*, verify the first transaction by evaluating the signature of the first computing node 102 on the first transaction and add the first transaction to the memory pools of the miner nodes of the blockchain network, e.g., the second computing nodes 104*a*-104*n*.

A user of the first computing node 102 may decide that the first transaction should no longer go through to the second computing node 104*a*. The first computing node 102 initiates a second transaction with a different computing node, e.g., the second computing node 104*a*, for the same digital asset as in the first transaction but this time with a higher priority. For example, the user of the first computing node 102 gives the second transaction a counter input of "−4" or any number lower that "1." Thus, the second transaction has a higher priority than the first transaction and should be mined first by the miner nodes of the blockchain network. The first computing node 102 digitally signs the second transaction using a private key associated with the first computing node 102 and broadcasts the signed second transaction along with the public key associated with the first computing node 102 to the blockchain network. The other nodes on the blockchain network, e.g., the second computing nodes 104*a*-104*n*, verify the second transaction by evaluating the signature of the first computing node 102 on the second transaction and add the second transaction to the memory pools of the miner nodes of the blockchain network, e.g., the second computing nodes 104*a*-104*n*. As stated above, transactions can only remain in the memory pool of a blockchain network for a defined period of time; therefore, the maximum time the user of the first computing node 102 has to initiate the second transaction is the defined clearing period of the memory pool. However, it can be appreciated that the first transaction is most likely to be mined from the memory pool before the clearing period. Therefore, the first computing node 102 should initiate the second transaction as soon as possible after the first transaction to ensure the first transaction is not mined before the second transaction is added to the memory pool. The sooner the first computing node 102 initiates the second transaction after the first transaction, the greater the change the miner nodes will mine the second transaction before the first transaction. Further, once the defined memory pool clearing period has lapsed, the computing nodes of the blockchain network may revert back to the initial or default counter input.

A miner node, e.g., the second computing node 104*n*, of the blockchain network, e.g., the network 106, receives the first transaction and the second transaction from the first computing node 102 in the memory pool, e.g., the memory pool 208, of the second computing node 104*n*. In an exemplary embodiment, the second computing node 104*n* compares the counter input of the first transaction and the second transaction from the first computing node 102 to determine whether the first transaction or the second transaction has a higher priority. The second computing node 104*n* determines that the second transaction has a higher priority counter input, e.g., "−4", than the first transaction which has a counter input of "1." The second computing node 104*n* validates the second transaction and mines the second transaction. The first transaction would thus be invalidated by the second computing node 104*n* because the digital asset associated with the first transaction has already been transferred from the first computing node 102 in the mined second transaction. While only two transactions are illustrated in the examples above, it can be appreciated that the first computing node 102 may initiate any number of superseding transactions for a single digital asset and the transaction with the highest priority counter input would be mined and the remaining transactions would be invalidated. As indicated above, the memory pools of the blockchain network have a defined clearing period; thus the first computing node 102 would have to keep decreasing the counter number to indicate a higher priority transaction during the defined clearing period. Once the defined memory pool clearing period has lapsed, the first computing node 102 may start the counter input back at the initial or default number, e.g., "1."

In current technologies, once the first transaction is verified by the blockchain network and added to the memory pool of the miner nodes, there is no way for the first computing node 102 to prevent that first transaction from being mined by the second computing nodes 104a-104n. A verified transaction may not be mined in current systems if 1) the transaction sits in the memory pool for an extended period time and is cleared from the memory pool automatically by the system; 2) if the original owner of a digital asset double spends the digital asset with a higher mining fee in the hope that the transaction with the higher mining fee is picked up first; or 3) if the original owner of the digital asset reaches out to mining pools within the network and requests the transaction not be picked up for mining. Thus, the methods and systems herein provide a novel solution, not addressed by current technology, to allow a user to supersede a first transaction for a digital asset with another transaction for the same digital asset using a counter input. Further, the methods and systems herein provide a novel solution, not addressed by current technology, to allow a user to supersede a first transaction for a digital asset with another transaction for the same digital asset using a higher mining fee. Thus, the methods and systems provided for herein provide for a deterministic way of superseding blockchain transaction with other blockchain transactions.

Computing System

Figure 2:
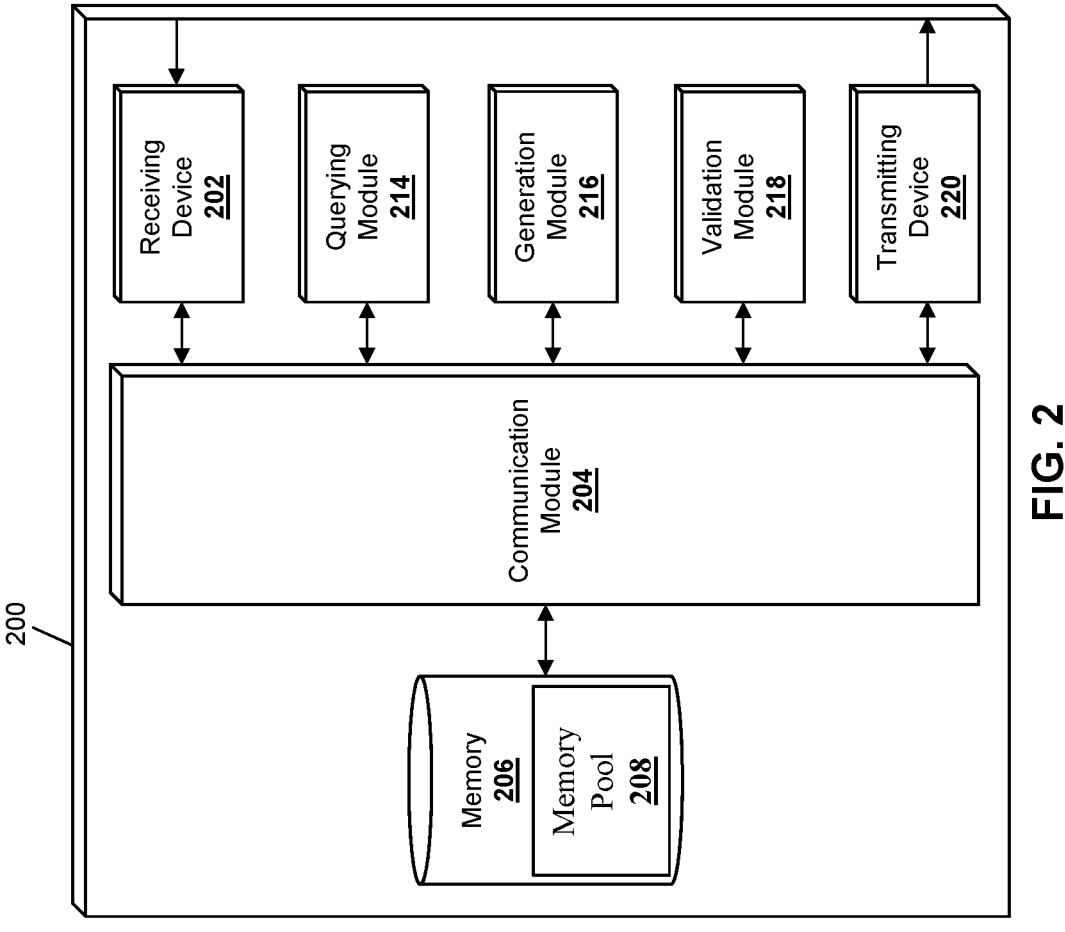
FIG. 2 is a block diagram illustrating a computing system of the system of FIG. 1 for superseding pending transactions in a distributed ledger in accordance with exemplary embodiments.

FIG. 2 illustrates an embodiment of a computing system 200, such as may serve as the first computing node 102 and/or the second computing nodes 104a-n in the system 100. It will be apparent to persons having skill in the relevant art that the embodiment of the computing system 200 illustrated in FIG. 2 is provided as illustration only and may not be exhaustive to all possible configurations of the computing system 200 specifically configured for performing the functions as discussed herein. For example, the computer system 400 illustrated in FIG. 4 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from the first computing node 102, the second computing nodes 104a-n, and other systems and entities via one or more communication methods, such as radio frequency, local area networks, wireless area networks, personal area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by the first computing node 102 that may be superimposed or otherwise encoded with one or more distributed ledger transactions, which may include a counter input and/or a transaction fee. The receiving device 202 may also be configured to receive data signals electronically transmitted by processing the second computing nodes 104a-n, which may be superimposed or otherwise encoded with one or more distributed ledger transactions, which may include a counter input and/or a transaction fee, and validations of the one or more distributed ledger transactions.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be hardware executing software or hardware otherwise particularly programmed to receive an input, perform one or more processes using the input, and provides an output. The input, output, and processes performed by various modules will be apparent to one skilled in the art based upon the present disclosure.

The computing system 200 may also include a memory 206. The memory 206 may be configured to store data for use by the computing system 200 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for the back-end system, etc.

The memory 206 may be configured to store a blockchain. As discussed above, the blockchain may be comprised of a plurality of blocks, where each block may be comprised of at least a block header and one or more data values. Each block header may include a time stamp, a block reference value referring to the preceding block in the blockchain, and a data reference value referring to the one or more data values included in the respective block. The memory 206 may also be configured to store any additional data that may be used by the computing system 200 in performing the functions discussed herein, such as transactions associated with the blockchain, communication data between the first computing node 102 and the second computing nodes 104a-n of the blockchain network, access data for providing access to the blockchain data by the first computing node 102 and the second computing nodes 104a-n, public keys corresponding to private keys provisioned to the first computing node 102 and the second computing nodes 104a-n for verification of digital signatures, etc. The memory 206 may include the memory pool 208 to store verified pending transactions associated with the blockchain. The memory pool 208 may be stored in the random access memory (RAM) of the memory 206.

The computing system 200 may include a querying module 214. The querying module 214 may be configured to execute queries on databases to identify information. The querying module 214 may receive one or more data values or query strings, and may execute a query string based thereon on an indicated database, such as the memory 206 of the computing system 200 to identify information stored therein. The querying module 214 may then output the identified information to an appropriate engine or module of the computing system 200 as necessary. The querying module 214 may, for example, execute a query on the memory 206 of the computing system 200 to verify one or more transactions initiated by the first computing node 102 and the second computing node 104a-104n. The querying model 214 may also, for example, execute a query on the memory 206 of the computing system 200 to select pending transactions between the nodes of the distributed ledger network from the memory pool 208 and to compare the counter inputs associated with those transactions.

The computing system 200 may also include a generation module 216. The generation module 216 may be configured to generate data for use by the computing system 200 in performing the functions discussed herein. The generation module 216 may receive instructions as input, may generate data based on the instructions, and may output the generated data to one or more modules of the computing system 200. For example, the generation module 216 may be configured to generate a distributed ledger transaction. Further, the generation module 216 may be configured to generate a counter input or mining fee to be associated with a distributed ledger transaction.

The computing system 200 may also include a validation module 218. The validation module 218 may be configured to perform validations for the computing system 200 as part of the functions discussed herein. The validation module 218 may receive instructions as input, which may include data to be validated and/or data to be used in the validation. The validation module 218 may perform a validation as requested and may output a result of the validation to another module or engine of the computing system 200. The validation module 218 may, for example, be configured to verify a transaction to be added to the memory pool 208 initiated by the first computing node 102. Further, the validation module 218 may, for example, be configured to validate and invalidate a transaction based on the counter inputs associated with a transaction.

The computing system 200 may also include a transmitting device 220. The transmitting device 220 may be configured to transmit data over one or more networks via one or more network protocols. In some instances, the transmitting device 220 may be configured to transmit data to the first computing node 102, the second computing nodes 104a-n, the network 106 and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to the second computing nodes 104a-n that are superimposed or otherwise encoded with one or more distributed ledger transactions, which may include a counter input and/or a transaction fee. The transmitting device 220 may also be configured to electronically transmit data signals to the first computing node 102 that may be superimposed or otherwise encoded with one or more distributed ledger transactions, which may include a counter input and/or a transaction fee, and validations of the one or more distributed ledger transactions.

Exemplary Method for Superseding Pending Transactions in a Distributed Ledger FIG. 3 illustrates a method 300 for superseding pending transactions in a distributed ledger in the perspective of the second computing node 104n in the system 100 of FIG. 1.

In block 302, a computing device (e.g., a second computing node 104n) receives (e.g., via the receiving device 202) a first transaction associated with a digital asset in a memory pool of a distributed ledger network, the first transaction having a first priority. The first transaction is received from the first computing node 102.

In block 304, the computing device (e.g., the second computing node 104n) receives (e.g., via the receiving device 202) a second transaction associated with a digital asset in the memory pool of a distributed ledger network, the second transaction having a second priority. The second transaction is received from the first computing node 102.

In block 306, the computing device (e.g., the second computing node 104n) analyzes (e.g., by a query executed by the querying module 214) the first priority of the first transaction and the second priority of the second transaction to determine a higher priority.

In block 308, if the computing device (e.g., the second computing node 104n) determines (e.g., by a query executed by the querying module 214) that the first priority of the first transaction is less than the second priority of the second transaction, the computing node will proceed to blocks 310-312. If the computing device (e.g., the second computing node 104n) determines (e.g., by a query executed by the querying module 214) that the first priority of the first transaction is greater than or equal to than the second priority of the second transaction, the computing node will proceed to blocks 314-316.

In block 310, the computing node (e.g., the second computing node 104n) validates (e.g., via the validation module 218) the second transaction having the second priority.

In block 312, the computing node (e.g., the second computing node 104n) invalidates (e.g., via the validation module 218) the first transaction having the first priority.

In block 314, the computing node (e.g., the second computing node 104n) validates (e.g., via the validation module 218) the first transaction having the first priority.

In block 316, the computing node (e.g., the second computing node 104n) invalidates (e.g., via the validation module 218) the second transaction having the second priority.

Computer System Architecture

Figure 4:
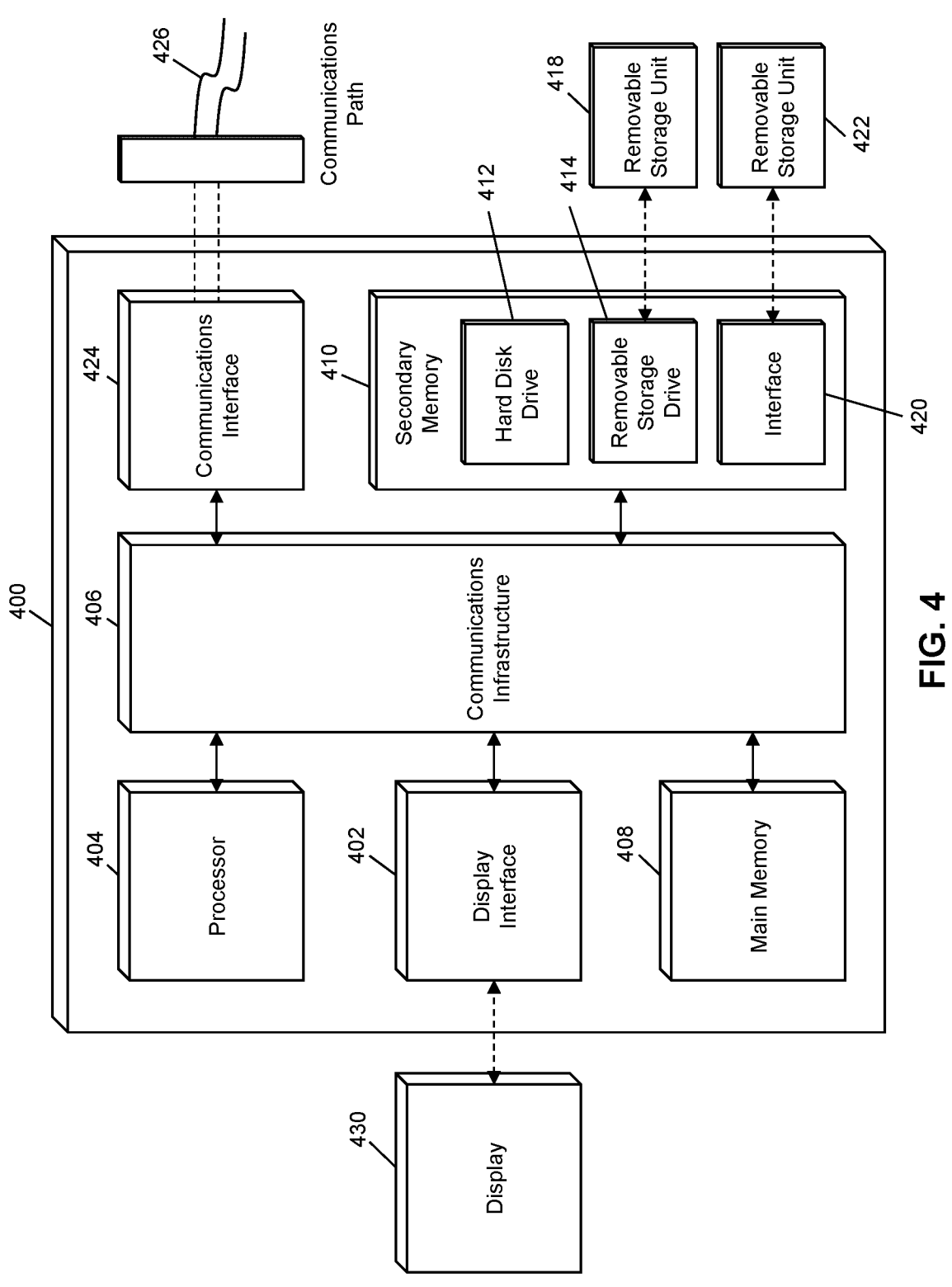
FIG. 4 is a block diagram illustrating a computer system architecture in accordance with exemplary embodiments.

FIG. 4 illustrates a computer system 400 in which embodiments of the present disclosure, or portions thereof, may be implemented as computer-readable code. For example, the first computing node 102 and the second computing nodes 104a-n of FIG. 1 and the computing system 200 of FIG. 2 may be implemented in the computer system 400 using hardware, software executed on hardware, firmware, non-transitory computer readable media having instructions stored thereon, or a combination thereof and may be implemented in one or more computer systems or other processing systems. Hardware, software, or any combination thereof may embody modules and components used to implement the method of FIG. 3.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the method illustrated by FIG. 3, as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for superseding a pending transaction in a distributed ledger. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing the disclosure, without departing from the breadth or scope.

What is claimed is:

1. A method for superseding a pending transaction in a blockchain, the method comprising:

initiating by a first computing node, a first transaction with a second computing node for a digital asset in a memory pool of a blockchain network, the first transaction being associated with a first counter input indicating a first priority of the first transaction;

in response to the first computing node initiating the first transaction with the second computing node, receiving, by a computing device of the blockchain network, from the first computing node, the first transaction associated with the digital asset, said computing device being a miner node of the blockchain network;

initiating, by the first computing node, a second transaction with a computing node different from the second computing node for the digital asset in the memory pool of the blockchain network, the second transaction being associated with a second counter input indicating a second priority of the second transaction;

in response to the first computing node initiating the second transaction with the computing node different from the second computing node, receiving, by the computing device, from the first computing node, the second transaction associated with the digital asset;

analyzing, by the computing device, the first priority of the first transaction and the second priority of the second transaction to determine a higher priority;

determining, by the computing device that the first priority of the first transaction is less than the second priority of the second transaction;

in response to determining that the first priority of the first transaction is less than the second priority of the second transaction, prioritizing, by the computing device, the second transaction having the second priority over the first transaction having the first priority; and validating, by the computing device, the second transaction having the second priority.

2. The method as in claim 1, further comprising:

in response to determining that the first priority of the first transaction is less than the second priority of the second transaction, invalidating, by the computing device, the first transaction having the first priority.

3. A method as in claim 1, wherein the first transaction and the second transaction are received by the computing device within a defined period of time, the period of time being defined by a length of time a transaction can sit in a memory pool of the computing device before being cleared.

4. A method as in claim 1, wherein the digital asset is a currency selected from the group consisting of: a digital currency, a virtual currency, and a fiat currency.

5. A method as in claim 1, wherein the first counter input and the second counter input are numbers and wherein a lower number indicates a higher priority.

6. A method as in claim 1, wherein the first counter input and the second counter input are numbers and wherein a higher number indicates a higher priority.

7. A system for superseding a pending transaction in a blockchain, the system comprising:

a blockchain network;

a first computing node;

a second computing node; and a computing device of the blockchain network, said computing device being a miner node of the blockchain network, wherein the first computing node is configured to initiate a first transaction with a second computing node for a digital asset in a memory pool of a blockchain network, the first transaction being associated with a first counter input indicating a first priority of the first transaction;

the computing device, of the blockchain network, in response to the first computing node initiating the first transaction with the second computing node, is configured to receive, from the first computing node, the first transaction associated with the digital asset, the first computing node is further configured to initiate a second transaction with a computing node different from the second computing node for the digital asset in the memory pool of the blockchain network, the second transaction associated with a second counter input indicating a second priority of the second transaction, in response to the first computing node initiating the second transaction with the computing node different from the second computing node, the computing device is configured to receive from the first computing node, the second transaction associated with the digital asset, analyze the first priority of the first transaction and the second priority of the second transaction to determine a higher priority, determine that the first priority of the first transaction is less than the second priority of the second transaction, and the second transaction having the second priority.

8. The system as in claim 7, further comprising:

in response to determining that the first priority of the first transaction is less than the second priority of the second transaction, instructions to invalidate, by the computing device, the first transaction having the first priority.

9. A system as in claim 7, wherein the first transaction and the second transaction are received by the computing device within a defined period of time, the period of time being defined by a length of time a transaction can sit in a memory pool of the computing device before being cleared.

10. A system as in claim 7, wherein the digital asset is a currency selected from the group consisting of: a digital currency, a virtual currency, and a fiat currency.

11. A system as in claim 7, wherein the first counter input and the second counter input are numbers and wherein a lower number indicates a higher priority.

12. A system as in claim 7, wherein the first counter input and the second counter input are numbers and wherein a higher number indicates a higher priority.

* * * * *